United States Patent
Kwon et al.

(10) Patent No.: US 11,750,373 B2
(45) Date of Patent: Sep. 5, 2023

(54) METHOD AND APPARATUS FOR MANAGING SECURITY KEY

(71) Applicant: Samsung Electronics Co., Ltd., Suwon-si (KR)

(72) Inventors: Sangwan Kwon, Suwon-si (KR); Taeho Kgil, Suwon-si (KR); Jinsu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/572,827

(22) Filed: Jan. 11, 2022

(65) Prior Publication Data
US 2022/0182226 A1   Jun. 9, 2022

Related U.S. Application Data

(63) Continuation of application No. PCT/KR2021/018232, filed on Dec. 3, 2021.

(30) Foreign Application Priority Data

Dec. 4, 2020   (KR) ........................ 10-2020-0168720

(51) Int. Cl.
*H04L 29/06* (2006.01)
*H04L 9/08* (2006.01)

(52) U.S. Cl.
CPC .......... *H04L 9/0819* (2013.01); *H04L 9/0866* (2013.01); *H04L 9/0891* (2013.01); *H04L 9/0894* (2013.01)

(58) Field of Classification Search
CPC ... H04L 9/0819; H04L 9/0866; H04L 9/0891; H04L 9/0894; H04L 9/085; H04L 9/0816; H04L 9/08
See application file for complete search history.

(56) References Cited

U.S. PATENT DOCUMENTS

| 9,379,889 B2 | 6/2016 | Bernsen | |
|---|---|---|---|
| 2004/0062400 A1* | 4/2004 | Sovio | H04L 9/3226 380/286 |

(Continued)

FOREIGN PATENT DOCUMENTS

| JP | 2020-080560 A | 5/2020 |
|---|---|---|
| KR | 10-2018-0059570 A | 6/2018 |

(Continued)

OTHER PUBLICATIONS

AWS KMS concepts—AWS Key Management Service, https://docs.aws.amazon.com/ko_kr/kms/latest/developerguide/concepts.html.

(Continued)

*Primary Examiner* — Yogesh Paliwal
(74) *Attorney, Agent, or Firm* — Jefferson IP Law, LLP

(57) ABSTRACT

A technique, performed by an electronic device, of managing a security key is provided. The electronic device may receive security information from each of at least one other electronic device, determine a master electronic device based on a security level of the electronic device and a security level of a security level of the at least one other electronic device, the security level of the at least one other electronic device being included in the received security information, generate a security key as the electronic device is determined as the master electronic device, and determine a portion to be removed from the security key for each security level of a plurality of electronic devices including the electronic device and the at least one other electronic device, and provide each partial security key from which the determined portion is omitted, to the at least one other electronic device.

20 Claims, 12 Drawing Sheets

(56) References Cited

U.S. PATENT DOCUMENTS

| | | | |
|---|---|---|---|
| 2010/0128876 A1* | 5/2010 | Yang | H04L 9/085 |
| | | | 380/259 |
| 2010/0235638 A1* | 9/2010 | Irvine | H04W 12/0433 |
| | | | 380/278 |
| 2016/0174070 A1 | 6/2016 | Wager et al. | |
| 2016/0292429 A1* | 10/2016 | Manville | G06F 3/0641 |
| 2017/0038989 A1 | 2/2017 | Seo et al. | |
| 2017/0255791 A1 | 9/2017 | Nam et al. | |
| 2019/0074964 A1 | 3/2019 | Park et al. | |
| 2019/0386972 A1* | 12/2019 | Boutnaru | G06Q 20/306 |
| 2020/0236113 A1* | 7/2020 | Monica | H04L 9/3213 |
| 2021/0182410 A1 | 6/2021 | Paterra et al. | |

FOREIGN PATENT DOCUMENTS

| | | |
|---|---|---|
| KR | 10-2294118 B1 | 8/2021 |
| KR | 10-2319661 B1 | 11/2021 |

OTHER PUBLICATIONS

Key Management Service—Security—NAVER Cloud Platform, https://www.ncloud.com/product/security/kms.

International Search Report dated Mar. 4, 2022, issued in International Application No. PCT/KR2021/018232.

* cited by examiner

METHOD AND APPARATUS FOR MANAGING SECURITY KEY

CROSS-REFERENCE TO RELATED APPLICATION(S)

This application is a continuation application, claiming priority under § 365(c), of an International application No. PCT/KR2021/018232, filed on Dec. 3, 2021, which is based on and claims the benefit of a Korean patent application number 10-2020-0168720, filed on Dec. 4, 2020, in the Korean Intellectual Property Office, the disclosure of which is incorporated by reference herein in its entirety.

TECHNICAL FIELD

The disclosure relates to a method and apparatus for managing a security key.

BACKGROUND ART

In the $5^{th}$ generation (5G) or beyond-5G environment, as progress is made in technologies for supporting connectivity, and electronic devices providing various functions are developed, the number of electronic devices coexisting within coverage will also increase. Also, in line with this, the number of electronic devices owned by one user or the number of electronic devices that a user shares with other users may also increase. In an environment as described above, increasing the security of data stored in an electronic device is a critical issue.

As a method for increasing security of data stored in an electronic device, a technique of storing data in an encrypted state by using an encryption key may be considered. The above technology may, however, involve the problem that data may be disclosed to an unintended target when a security key for decrypting the encrypted data is exposed. Accordingly, there is a need to develop a technology for safely managing a security key.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a security key management technique of safely managing a security key used in decrypting encrypted data that may be provided in an environment in which there are a plurality of electronic devices.

Additional aspects will be set forth in part in the description which follows and, in part, will be apparent from the description, or may be learned by practice of the presented embodiments.

Solution to Problem

In accordance with an aspect of the disclosure, an electronic device for managing a security key is provided. The electronic device includes a communication unit, a memory storing one or more instructions, and a processor configured to execute the one or more instructions stored in the memory, receive, through the communication unit, security information from each of at least one other electronic device, determine a master electronic device based on a security level of the electronic device and a security level of a security level of the at least one other electronic device, the security level of the at least one other electronic device being included in the received security information, generate a security key based on a result of the determination, and determine a portion to be removed from the security key for each security level of a plurality of electronic devices including the electronic device and the at least one other electronic device, and provide, through the communication unit, each partial security key from which the determined portion is omitted, to the at least one other electronic device.

The at least one processor may be further configured to remove a portion of the security key, the portion corresponding to the security level of the electronic device, and store a partial security key obtained by removing a portion corresponding to the security level of the electronic device.

The at least one processor may be further configured to request, from the at least one other electronic device through the communication unit, the removed portion according to reception of a request for decryption of encrypted data of the electronic device, receive, through the communication unit, the removed portion from the at least one other electronic device, based on the request, and decrypt the encrypted data based on a security key generated using the removed portion and the stored partial security key.

The at least one processor may be further configured to identify another electronic device that is closest to the electronic device among the at least one other electronic device, and request, through the communication unit, the removed portion from the identified other electronic device.

The at least one processor may be further configured to receive, through the communication unit, a request for the removed portion from the security key from one of the at least one other electronic device, identify the removed portion of the security key, the removed portion corresponding to the at least one other electronic device that has transmitted the request, and provide, through the communication unit, the identified portion to the at least one other electronic device.

The at least one processor may be further configured to receive, through the communication unit, new security information from another electronic device other than the at least one other electronic device, update the master electronic device based on a security level included in the new security information, and as new security information is received, update the security key and the portion to be removed from the security key for each security level.

The at least one processor may be further configured to identify another electronic device, a communication session of which is interrupted, among the at least one other electronic device, and update the portion to be removed from the security key for each security level based on the security level of the electronic device and the security level with respect to the other electronic devices, the communication session of which is interrupted, among the at least one other electronic device.

The at least one processor may be further configured to update the portion to be removed from the security key for each security level, based on a changed security level as a security level of one of the electronic device and the at least one other electronic device is changed.

The at least one processor may be further configured to, as one of the at least one other electronic device is determined as a master electronic device, receive, through the communication unit, a partial security key obtained by removing a portion corresponding to the security level of the electronic device from the security key, from the determined other electronic device.

The security level of the electronic device may be determined based on at least one of a key storage on hardware, a key storage on software, an operating system, a communication network, or a location of the electronic device.

The at least one partial security key provided to each electronic device may be discarded after a preset period of time after generating the security key.

In accordance with another aspect of the disclosure, a method, performed by an electronic device, of managing a security key is provided. The method includes receiving security information from each of at least one other electronic device, determining a master electronic device based on a security level of the electronic device and a security level of the at least one other electronic device, the security level of the at least one other electronic device being included in the received security information, generating a security key based on a result of the determination, determining a portion to be removed from the security key for each security level of a plurality of electronic devices including the electronic device and the at least one other electronic device; and providing each partial security key from which the determined portion is omitted, to the at least one other electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE OF DISCLOSURE

Figure 1:
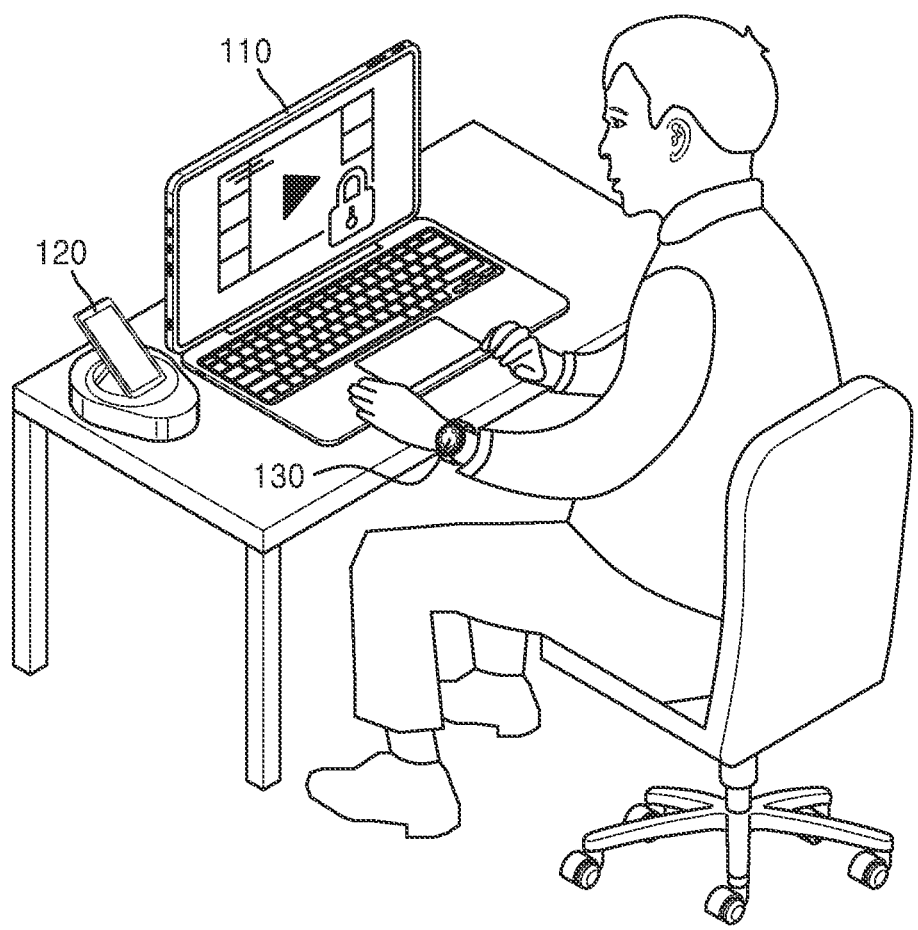
FIG. 1 is a conceptual diagram for describing a method of managing a security key in an environment in which there are a plurality of electronic devices, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described more fully with reference to the accompanying drawings. In the description of the embodiments, descriptions of technical content that is well known in the art to which the disclosure pertains and are not directly related to the disclosure will be omitted. This is to clearly convey the gist of the disclosure without obscuring the gist of the disclosure by omitting unnecessary description.

For the same reason, in the attached drawings, each constituent element is exaggerated, omitted, or schematically illustrated. In addition, the size of each constituent element does not perfectly reflect an actual size. Those elements that are the same or are in correspondence are rendered the same reference numeral.

Advantages and features of the disclosure, and methods of achieving the same, will become apparent with reference to the embodiments described below in detail in conjunction with the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals denote like elements.

Herein, it will be understood that each block of the flowchart diagrams and combinations of the flowchart diagrams may be performed by computer program instructions. These computer program instructions may be embedded in a processor of a general purpose computer, special purpose computer, or other programmable data processing equipment, and thus, the instructions executed by the processor of the computer or other programmable data processing equipment form are not units for performing the functions described in the flowchart block(s). These computer program instructions may also be stored in a computer-usable or computer-readable memory that may direct a computer or other programmable data processing equipment to implement a function in a particular manner, and thus the instructions stored in the computer-usable or computer-readable memory may produce an article of manufacture containing instruction means for performing a function described in the flowchart block(s). As the computer program instructions may also be embedded on a computer or other programmable data processing equipment, a series of operations may be performed on the computer or other programmable data processing equipment to create a computer-executed process so that instructions for performing the computer or other programmable data processing equipment provide operations for executing the functions described in the flowchart block(s).

Also, each block may represent a module, segment, or portion of code that includes one or more executable instructions for executing specified logical function(s). It should also be noted that in some alternative implementations the functions recited in the blocks may occur out of order. For example, two blocks shown one after another may in fact be performed substantially simultaneously, or the blocks may be occasionally performed in the reverse order according to the corresponding function.

The term ' . . . unit' used in the description refers to software or hardware components such as Field Programmable Gate Array (FPGA) or Application Specific Integrated Circuit (ASIC), and a ' . . . unit' performs certain functions. However, ' . . . unit' is not limited to software or hardware. The term ' . . . unit' may be configured to be included in an addressable storage medium or to reproduce one or more processors. Thus, as an example, the term ' . . . unit' may include, by way of example, object-oriented software components, class components, and task components, and processes, functions, attributes, procedures, subroutines, segments of a program code, drivers, firmware, a micro code, a circuit, data, a database, data structures, tables, arrays, and variables. The functions provided in the components and ' . . . unit' may be combined into a smaller number of components and ' . . . unit' or further separated into additional components and ' . . . unit'. In addition, components and ' . . . units' may be implemented to reproduce one or more central processing unit (CPUs) in a device or secure multimedia card. Also, in an embodiment of the disclosure, ' . . . unit' may include one or more processors.

In the disclosure, an electronic device may include a user equipment (UE), a mobile station (MS), a cellular phone, a smart phone, a computer, a wearable device, a tablet, a laptop, a notebook computer, or a multimedia system capable of performing a communication function.

FIG. 1 is a conceptual diagram for describing a method of managing a security key in an environment in which there are a plurality of electronic devices, according to an embodiment of the disclosure.

Referring to FIG. 1, in the 5th generation (5G) or beyond-5G environment, as progress is made in technologies for supporting connectivity, and electronic devices providing various functions are developed, the number of electronic devices coexisting within coverage will also increase. Also, in line with this, the number of electronic devices owned by one user or the number of electronic devices that a user shares with other users may also increase. In an environment as described above, increasing the security of data stored in an electronic device is a critical issue. The disclosure provides a method by which, when encrypted data requiring security is stored in an electronic device, a security key for decrypting the encrypted data is managed by a plurality of coexisting electronic devices.

Referring to FIG. 1, a plurality of electronic devices may be connectable to each other, such as a tablet 110, a smartphone 120, and a smart watch 130. Encrypted data may be stored in at least one of the plurality of electronic devices 110, 120, or 130. The encrypted data may be decrypted using a security key corresponding to an encryption key used to encrypt the data, and depending on the encryption technology used, the encryption key and the security key may be symmetric or asymmetric. The security key management method proposed in the disclosure is applicable to both symmetric or asymmetric encryption keys and security keys, but for convenience of description, a symmetric encryption key and security key will be taken as an example in the disclosure.

When all security keys used for decrypting encrypted data are stored in all of the plurality of electronic devices 110, 120, and 130, and the security key stored in any one electronic device (for example, 130) is hacked, as the encrypted data is easily exposed, the security of data may be undermined. According to the security key management method according to the disclosure, to improve security, a portion of the security key may be stored in each of the plurality of electronic devices 110, 120, and 130. The plurality of electronic devices 110, 120, and 130 according to an embodiment of the disclosure may store partial security keys obtained by removing different portions from a security key. For example, when the plurality of electronic devices 110, 120, and 130 initially recognize each other and establish a communication session, they may share information about each other's security level together with initial setting information, and may determine, based on the information about each other's' security level, which portion of each security key is to be excluded and which portion of each security key is to be remained in a security key. An electronic device determined as a master electronic device among the plurality of electronic devices 110, 120, and 130 may determine whether to generate a security key and which portion of the security key to exclude from each electronic device. This will be described later in further detail later with reference to FIG. 2.

When a situation arises in which decryption of encrypted data is required in any one of the plurality of electronic devices 110, 120, and 130, the one electronic device may request a security key portion that is not stored in other nearby electronic devices. For example, when a user requests decryption of encrypted data stored in the tablet 110, the tablet 110 may request a security key portion that is not stored in the tablet 110, from the smart phone 120 among the other electronic devices in the vicinity. The tablet 110 may receive the requested security key portion from the smart phone 120 in response to the request, and generate a security key by combining the requested security key portion with a partial security key stored in the tablet 110. The tablet 110 may decrypt the encrypted data based on the generated security key to provide the decrypted data to the user.

The electronic device according to an embodiment of the disclosure may receive a security key portion that is not stored in the electronic device, from other nearby electronic devices, and generate a security key based on the received security key portion, and thus may access data of a certain application or data of a certain web browser by using the security key.

Figure 2:
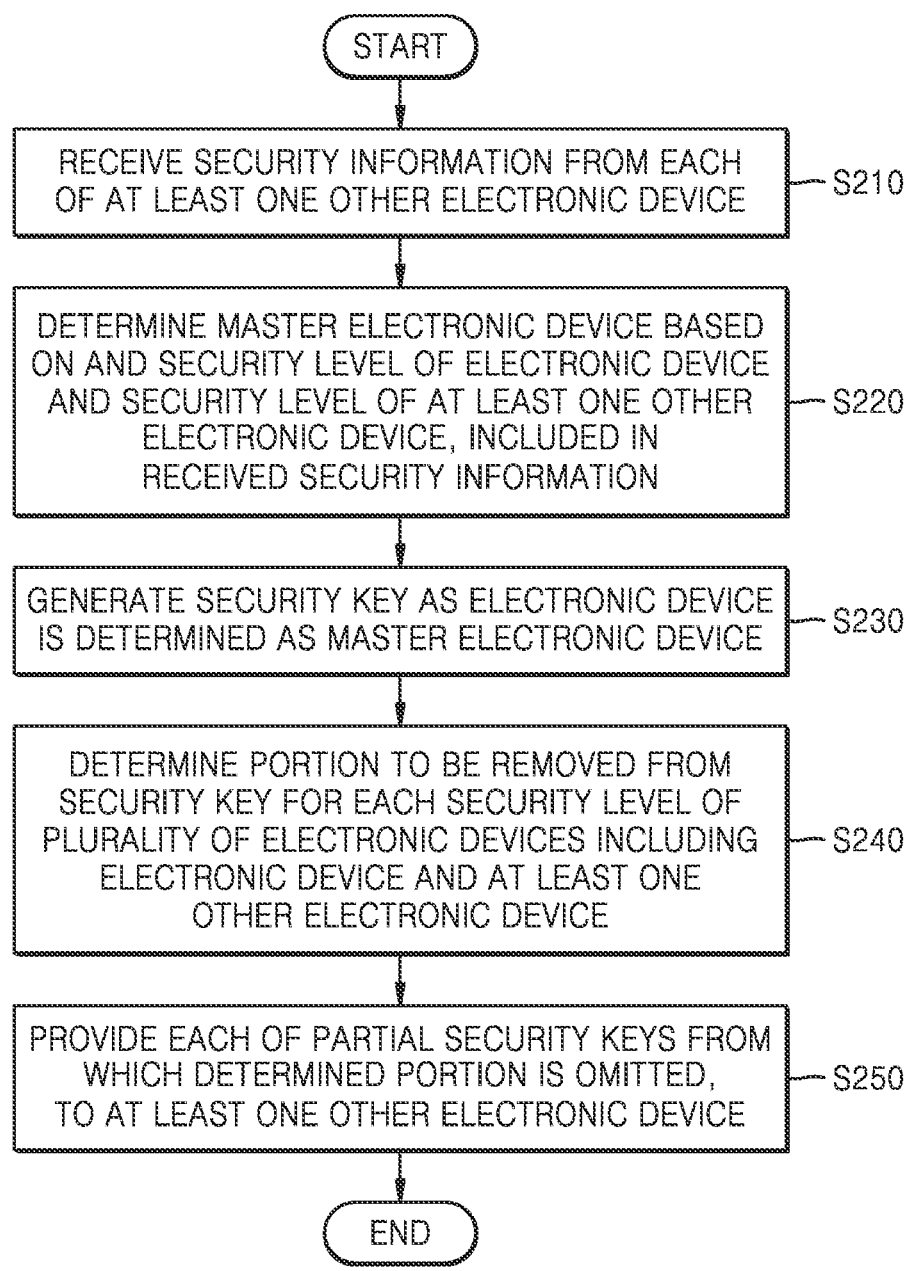
FIG. 2 is a flowchart for describing a method, performed by an electronic device, of managing a security key according to an embodiment of the disclosure.

FIG. 2 is a flowchart for describing a method, performed by an electronic device, of managing a security key according to an embodiment of the disclosure.

Referring to FIG. 2, in operation S210, the electronic device may receive security information from each of at least one other electronic device. The security information may include information for determining a security level of an electronic device, or may include the security level itself. The security level is an index indicating a security strength of a security key. For example, the higher a security level of an electronic device, a longer and more complex may be a generated security key. The information for determining a security level of an electronic device may include information on a key storage on hardware, a key storage on software, and information on a type and version of an operating system. For example, when there is a trust zone that general applications cannot access, in a hardware storage, or a hardware accelerator that encrypts and manages information used as a basis for generating security keys exists, a higher security level may be set to an electronic device with the above hardware storage than an electronic device without a trust zone or an accelerator. In addition, when a version of software or an operating system of an electronic device is a latest one, a higher security level may be set to the electronic device than an electronic device in which software or an operating system of a previous version is installed. As another example, the information for determining a security level may include information about a type and location of a communication network. For example, a higher security level may be set to an electronic device connected to a 5G network than an electronic device connected to a Wi-Fi network, and a higher security level may be set to an electronic device located in a private facility such as a home than an electronic device located in a public facility such as a cafe or a library.

Security information may be received together with identification information of an electronic device to which the identification information corresponds. For example, in an initial connection process in which electronic devices recognize each other to establish a communication session, security information may be exchanged between the electronic devices together with information necessary for establishing the communication session. At least one of a unicast method, a multicast method, or a broadcast method may be used as a method of exchanging security information or the like between electronic devices, and also, other communication methods may be used to exchange security information between electronic devices.

In operation S220, the electronic device may determine a master electronic device based on a security level of the at least one other electronic device, included in the received security information, and the security level of the electronic device.

The electronic device according to an embodiment of the disclosure may determine a security level of each of at least one other electronic device from the received security information. An operation of determining a security level may be performed in each of the electronic device and the at least one other electronic device. Hereinafter, for convenience of description, the electronic device and the at least one other electronic device are collectively referred to as a plurality of electronic devices.

Each of the plurality of electronic devices may determine an electronic device having a highest security level as a master electronic device based on the exchanged security information. For example, as described above with reference to FIG. 1, when security information is exchanged between the tablet 110, the smart phone 120, and the smart watch 130, the tablet 110, the smart phone 120 and the smart watch 130 may each determine a master electronic device by comparing each other's security levels. For example, when the security levels of the tablet 110, the smart phone 120, and the smart watch 130 are level 2, level 1, and level 3, respectively, the smart phone 120 may be determined to be the master electronic device.

In operation S230, the electronic device may generate a security key as the electronic device is determined as the master electronic device.

The electronic device determined as the master electronic device may generate a security key through a preset security key generation algorithm A symmetric cryptographic algorithm or an asymmetric encryption algorithm may be used to generate a security key, and in the disclosure, an algorithm for generating a security key is not limited to a certain algorithm.

In operation S240, the electronic device may determine a portion to be removed from the security key for each security level of the plurality of electronic devices including the electronic device and the at least one other electronic device.

The electronic device may determine a portion to be removed from the generated security key for each security level. For example, when a length of the generated security key is L bits, and the number of the plurality of electronic devices including the electronic device is N, a length of a portion to be removed for each electronic device may be determined as L/N bits. Each portion obtained by dividing the L bits of the security key the number of the plurality of electronic devices N will be described as a chunk. In this case, a length of the chunk is L/N bits. When the number of the plurality of electronic devices is three, a length of each chunk may be L/3 bits, and the security key may consist of a total of three chunks.

In the above-described embodiment of FIG. 1, when the security levels of the tablet 110, the smart phone 120, and the smart watch 130 are level 2, level 3, and level 1, respectively, the smart phone 120 is the master electronic device, the smart phone 120 may determine to provide the tablet 110 with a partial security key obtained by removing a second chunk portion from the security key. In addition, the smart phone 120 may determine to store, in the smart phone 120, a partial security key obtained by removing a third chunk portion from the security key. In addition, the smart phone 120 may determine to provide the smart watch 130 with a partial security key obtained by removing a first chunk portion from the security key.

In operation S250, the electronic device may provide each of the partial security keys from which the determined portion is omitted, to the at least one other electronic device. The electronic device may provide a partial security key, from which a portion corresponding to each security level is omitted, to the at least one other electronic device. Also, the electronic device may store a partial security key from which a portion corresponding to the security level of the electronic device itself is omitted.

The electronic device according to an embodiment of the disclosure may request the removed portion from the at least one other electronic device when a decryption request for encrypted data of the electronic device is received. Also, when the removed portion is received from the at least one other electronic device based on a request, the electronic device may generate a security key by using the removed portion and a partial security key stored in the electronic device. The generated security key may be used to decrypt the encrypted data.

An electronic device according to another embodiment of the disclosure may receive a request for a removed portion of a security key from another electronic device. The electronic device may provide the other electronic device with the removed portion of the security key corresponding to the request. The other electronic device may generate a security key by using the security key portion provided by the electronic device, and decrypt encrypted data by using the generated security key.

At least one partial security key provided to each electronic device may be discarded after a preset period of time after generating the security key.

Figure 3:
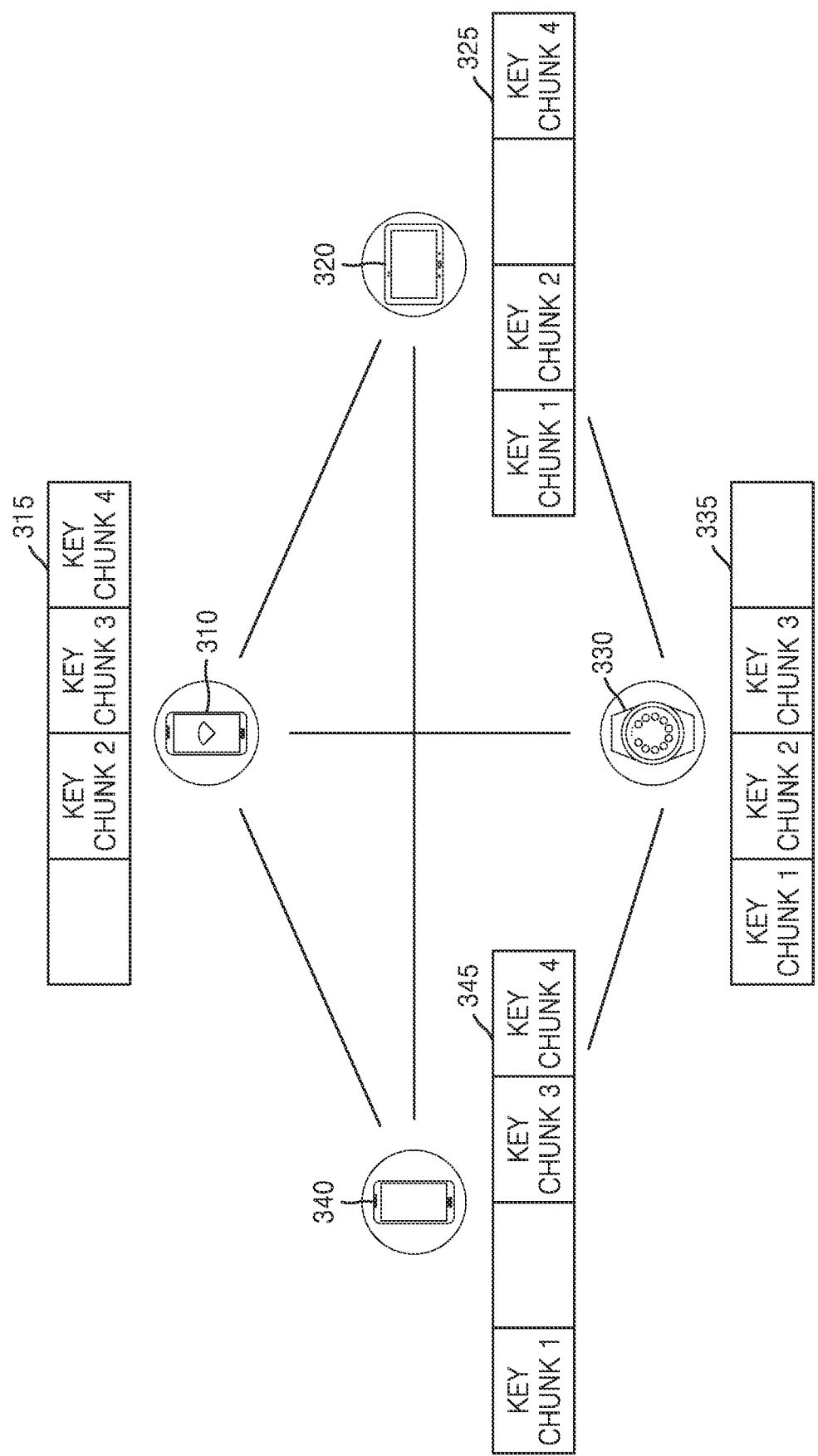
FIG. 3 is a diagram for describing a method, performed by an electronic device, of providing a partial security key from which a portion corresponding to a security level is omitted according to an embodiment of the disclosure.

FIG. 3 is a diagram for describing a method, performed by an electronic device, of providing a partial security key from which a portion corresponding to a security level is omitted according to embodiment of the disclosure.

Referring to FIG. 3, a communication session may be established between a plurality of electronic devices including a first smart phone 310, a tablet 320, a smart watch 330, and a second smart phone 340. Types of communication sessions may be the same for all electronic devices, or different types of communication sessions may be established according to a communication method supported by respective electronic devices. For example, a communication session may be established between the first smart phone 310 and the tablet 320 through Wi-Fi, and a communication session may be established between the tablet 320 and the smart watch 330 through Bluetooth, and a communication session may be established between the first smart phone 310 and the second smart phone 340 through a 5G network.

The plurality of electronic devices may transmit or receive security information through each established communication session. Also, the plurality of electronic devices may compare their security levels with one another, and thus, may determine a master electronic device having a highest security level. As described above with reference to FIG. 2, a security level may be determined based on at least one of a key storage on hardware, a key storage on software, an operating system, a communication network, or a location of an electronic device, and in the embodiment, the first smart phone 310 is assumed to have a highest security level.

As the first smart phone 310 is determined as the master electronic device, the first smart phone 310 may generate a security key according to a preset algorithm. The generated security key may be 4M bits. The first smart phone 310 may generate four chunks by dividing the 4M-bit length security key into four, which is the number of the plurality of electronic devices. In the embodiment, to identify the four chunks constituting the security key, the chucks will be named key chunk 1, key chunk 2, key chunk 3 and key chunk 4, respectively.

The first smart phone 310 may determine a portion to be removed from the security key for each security level of the electronic devices. For example, the first smart phone 310 may determine a portion to be removed from the tablet 320, as key chunk 3. Accordingly, the first smart phone 310 may provide the tablet 320 with a partial security key 325 from which key chunk 3 is omitted. The first smart phone 310 may determine a portion to be removed from the smart watch 330, as key chunk 4. Accordingly, the first smart phone 310 may provide the smart watch 330 with a partial security key 335 from which key chunk 4 is omitted. The first smart phone 310 may determine a portion to be removed from the second smart phone 340, as key chunk 2. Accordingly, the first smart phone 310 may provide the second smart phone 340 with a partial security key 345 from which the key chunk 2 is omitted. The first smart phone 310 may store a partial security key 315, from which key chunk 1 corresponding to its own security level is omitted.

When decryption of encrypted data is required in any one of the plurality of electronic devices 310, 320, 330, and 340, the one electronic device (for example, 320) may request from at least one of other electronic devices (for example, 310) a security key portion omitted therefrom and receive the omitted security key portion. For example, the tablet 320 may request key chunk 3 from the first smart phone 310 and receive key chunk 3 from the first smart phone 310. The tablet 320 may generate a security key by combining the received key chunk 3 and the stored partial security key 325, and decrypt encrypted data by using the generated security key.

Figure 4:
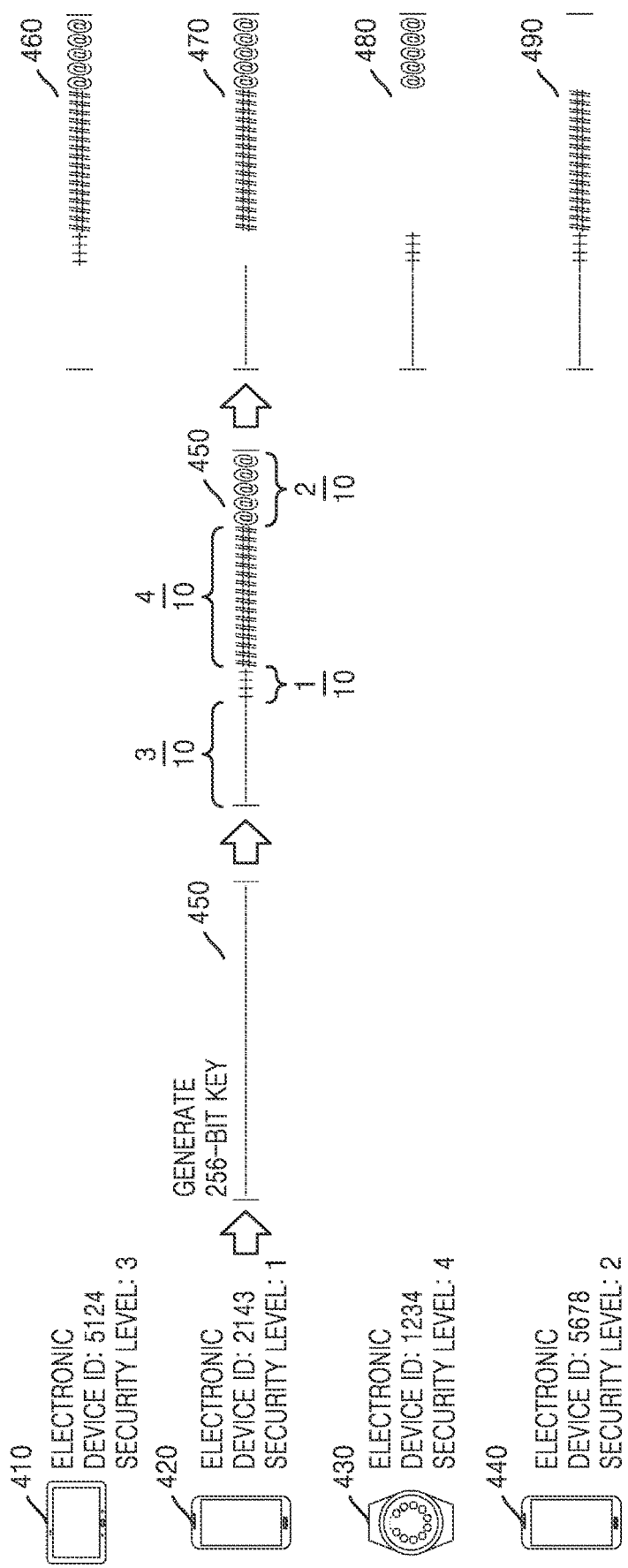
FIG. 4 is a diagram for describing a method, performed by an electronic device, of determining a portion to be removed from a security key based on a security level according to an embodiment of the disclosure.

FIG. 4 is a diagram for describing a method, performed by an electronic device of determining a portion to be removed from a security key based on a security level according to an embodiment of the disclosure.

Referring to FIG. 4, among a first electronic device 410, a second electronic device 420, a third electronic device 430, and a fourth electronic device 440, information about electronic device identifiers (IDs) and security levels may be exchanged. Each electronic device may transmit information about their own electronic device IDs and security levels to other nearby electronic devices by using a multicast or broadcast method. However, this is merely an embodiment of the disclosure, and the electronic devices may also transmit information about their electronic device IDs and security levels to each of the nearby electronic devices by using a unicast method.

Each of the plurality of electronic devices 410, 420, 430, and 440 may determine a master electronic device by comparing their security levels with those of other electronic devices. In the embodiment illustrated in FIG. 4, as the security levels of the first electronic device 410, the second electronic device 420, the third electronic device 430, and the fourth electronic device 440 are level 3, level 1, level 4, and level 2, respectively, the second electronic device 420 may be determined as a master electronic device.

When the second electronic device 420 is determined as the master electronic device, the second electronic device 420 may generate a security key 450 according to a preset algorithm. It is assumed here that the generated security key 450 has a length of 256 bits. The second electronic device 420 may determine a security weight based on the security levels of each electronic device. A security weight is information whereby a portion to be removed from a security key, and may be determined as a value obtained by dividing the security levels of each electronic device by a sum of the security levels of the plurality of electronic devices 410, 420, 430, and 440. For example, security weights of the first electronic device 410, the second electronic device 420, the third electronic device 430, and the fourth electronic device 440 may be determined to be 3/10, 1/10, 4/10, and 2/10, respectively.

The second electronic device 420 may provide each electronic device with the remaining portion after removing a portion corresponding to the security weight of each electronic device. In the specification, a security key from which a portion corresponding to a security weight is removed will be described as a partial security key. For example, the second electronic device 420 may provide the first electronic device 410 with a partial security key 460 corresponding to the security key 450 from which a 3/10 portion is removed. The second electronic device 420 may provide a partial security key 480 corresponding to the security key 450, from which a 4/10 portion is removed, and a partial security key 490 corresponding to the security key 450, from which a 2/10 portion is removed, to the third electronic device 430 and the fourth electronic device 440, respectively. The second electronic device 420 may store the partial security key 470, from which a 1/10 portion corresponding to its security weight is removed.

As described above, according to the security key management method according to an embodiment of the disclosure, the problem of exposing the entire security key when an electronic device is hacked may be prevented by storing a partial security key in the electronic device, instead of the entire security key, thereby improving the security. When a security key is to be generated, the electronic device may request from other electronic devices nearby a portion removed from the security key and receive the removed portion and generate the entire security key by combining the removed portion and a partial security key.

Figure 5:
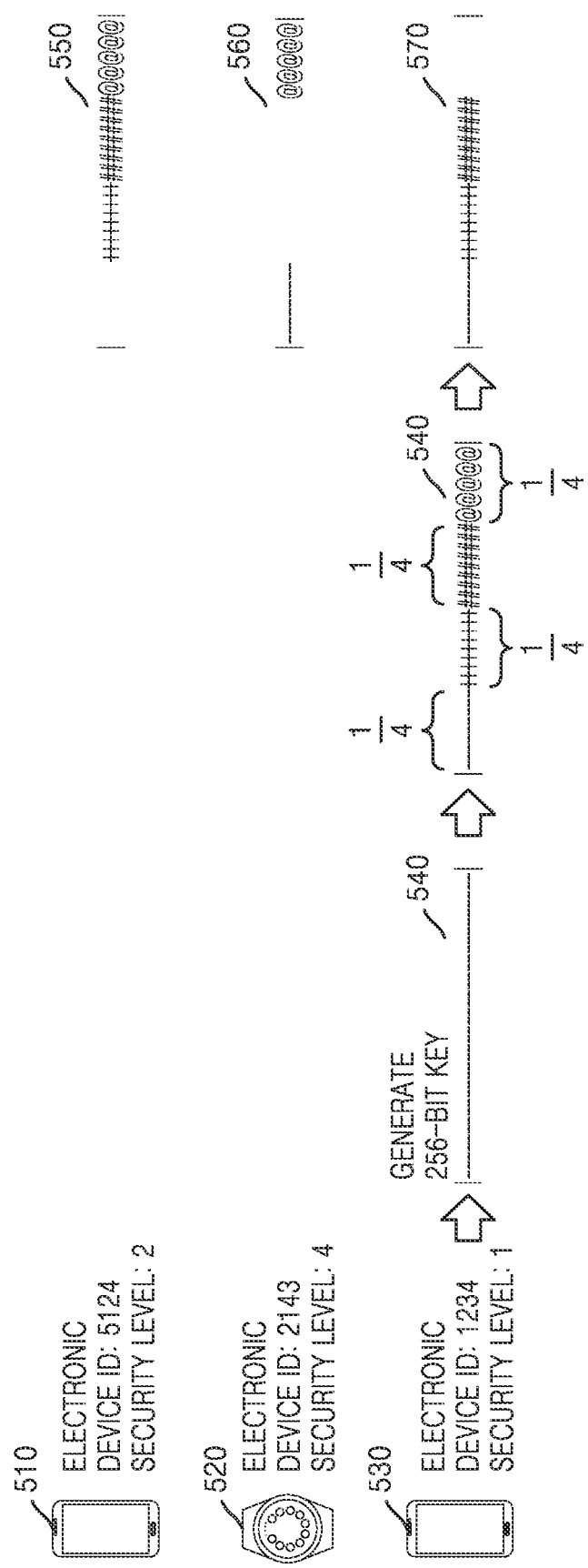
FIG. 5 is a diagram for describing a method, performed by an electronic device, of determining a portion to be removed from a security key based on a security level according to an embodiment of the disclosure.

FIG. 5 is a diagram for describing a method, performed by an electronic device of determining a portion to be removed from a security key based on a security level according to an embodiment of the disclosure.

Referring to FIG. 5, among a first electronic device 510, a second electronic device 520, and a third electronic device 530, information about electronic device IDs and security levels may be exchanged. Each electronic device may transmit information about their own electronic device IDs and security levels to other nearby electronic devices by using a multicast or broadcast method. However, this is merely an embodiment of the disclosure, and the electronic devices may also transmit information about their electronic device IDs and security levels to each of the nearby electronic devices by using a unicast method.

Each of the plurality of electronic devices 510, 520, and 530 may determine a master electronic device by comparing their security levels with those of other electronic devices. In the embodiment illustrated in FIG. 5, as the security levels of the first electronic device 510, the second electronic device 520, and the third electronic device 530 are level 2, level 4, and level 1, respectively, the third electronic device 530 may be determined as a master electronic device.

When the third electronic device 530 is determined as the master electronic device, the third electronic device 530 may generate a security key 540 according to a preset algorithm. It is assumed here that the generated security key 540 has a length of 256 bits. The third electronic device 530 may determine a portion to be removed from a security key for each electronic device based on the security levels.

In this description, it is assumed that the security key is divided according to a preset number, and two portions are removed from a security key of an electronic device having a lower security level than a preset level (e.g., 2). For example, the third electronic device 530 may divide the security key 540 into four and provide first electronic device 510 with a partial security key 550 from which a 1/4 portion is omitted. The third electronic device 530 may provide the second electronic device 520 with a partial security key 560 corresponding to the security key 540, from which a 2/4 portion is removed. The third electronic device 530 may store a partial security key 570 corresponding to the security key 540, from which a 1/4 portion is removed.

According to the security key management method according to an embodiment of the disclosure, an electronic device having a low security level is configured to request a removed portion of a security key from a plurality of other electronic devices in the vicinity, thereby preventing the risk of exposure of the security key from the electronic device that is weak to security.

Figure 6:
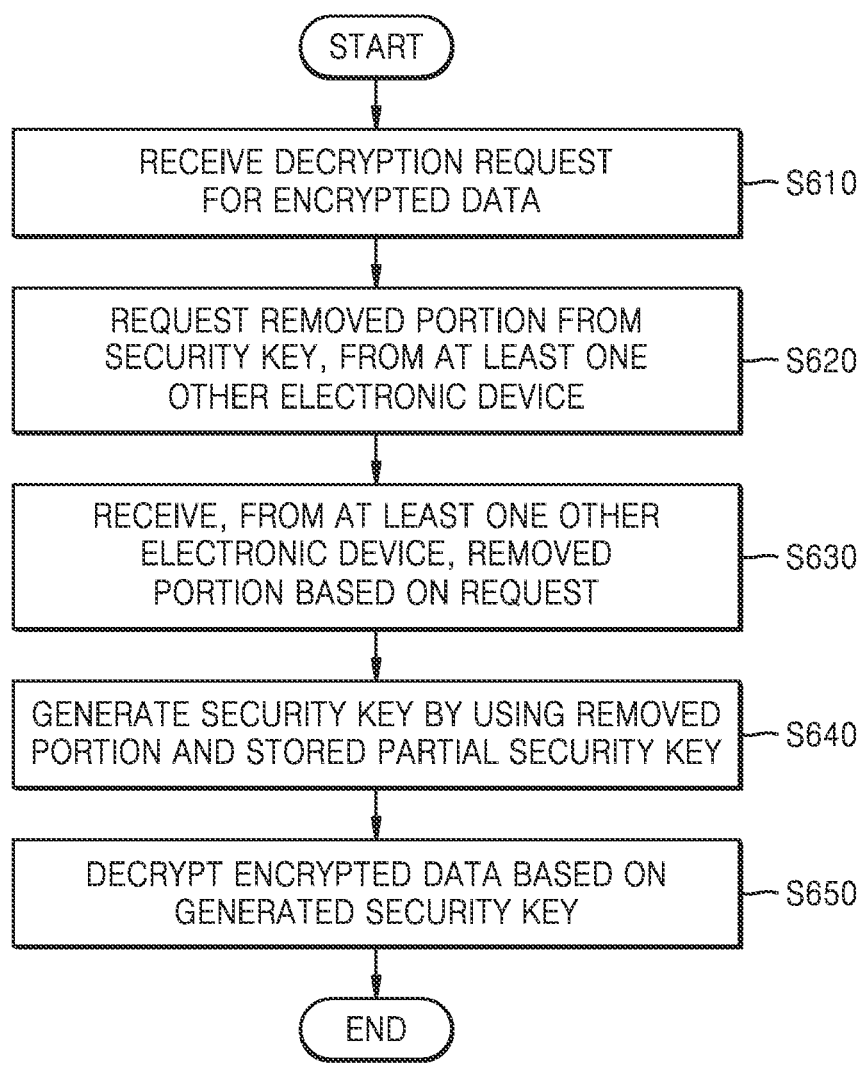
FIG. 6 is a flowchart of a method, performed by an electronic device, of receiving a portion removed from a security key from another electronic device and generating a security key according to an embodiment of the disclosure.

FIG. 6 is a flowchart of a method, performed by an electronic device of receiving a portion removed from a security key from another electronic device and generating a security key according to an embodiment of the disclosure.

Referring to FIG. 6, in operation S610, the electronic device may receive a decryption request for encrypted data. To protect information of a user, access-restricted data according to a user's request or a setting of an electronic device may be stored in the electronic device. The data may be stored in an encrypted form in order to restrict access, and in order to read the data, a security key corresponding to an encryption key is to be provided.

The electronic device according to an embodiment of the disclosure may receive a user input requesting to display locked data in the electronic device, or according to another embodiment of the disclosure, the electronic device may receive a request to view user's personal information. However, this is merely an example, and the decryption request is not limited to the above-described forms.

In operation S620, the electronic device may request a removed portion from a security key, from at least one other electronic device. It is assumed that the electronic device according to the embodiment of the disclosure is an electronic device that stores a partial security key generated according to the method as described above in FIG. 2.

When a decryption request for encrypted data is received, the electronic device may request, from another electronic device, the removed portion to generate the entire security key based on a partial security key stored therein. For example, the electronic device may specify the removed portion and transmit a request message including information on the specified portion to other nearby electronic devices. According to another example, the electronic device may transmit a request message for requesting to provide a security key to other nearby electronic devices without specifying the removed portion.

In addition, the electronic device may transmit the request message in the form of multicasting or broadcasting so that other nearby electronic devices may receive the request message. However, this is merely an example, and the electronic device may specify a closest electronic device among the other nearby electronic devices and transmit a request message to the specified electronic device.

In operation S630, the electronic device may receive, from the at least one other electronic device, the removed portion based on the request. The electronic device according to an embodiment of the disclosure may receive the removed portion from another electronic device when a request is made by specifying the removed portion in operation S620 described above. According to another embodiment of the disclosure, when the removed portion is not specified in operation S620, the electronic device may receive a partial security key stored in another electronic device.

In operation S640, the electronic device may generate a security key by using the removed portion and the stored partial security key.

In operation S650, the electronic device may decrypt the encrypted data based on the generated security key. For example, when receiving a user input requesting to display of locked data in the electronic device, the electronic device may unlock the locked data based on the security key. According to another example, when receiving a request to view the user's personal information, the electronic device may decrypt user's encrypted personal information based on the security key. However, this is merely an example, and the decrypted data is not limited to the above-described examples.

Figure 7:
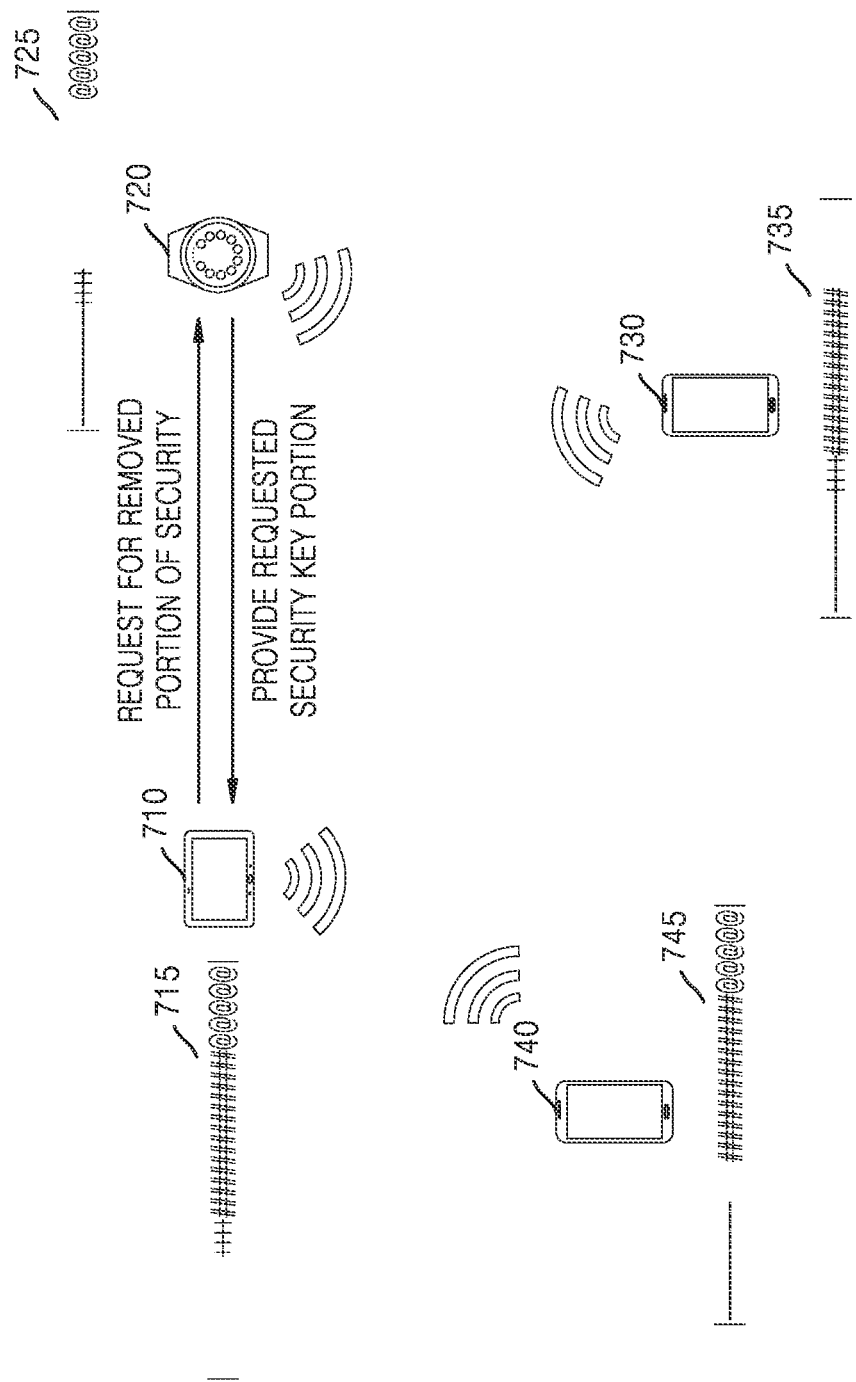
FIG. 7 is a diagram for describing a method, performed by an electronic device, of receiving a portion removed from a security key from another electronic device and generating a security key according to an embodiment of the disclosure.

FIG. 7 is a diagram for describing a method, performed by an electronic device of receiving a portion removed from a security key from another electronic device and generating a security key according to an embodiment of the disclosure.

Referring to FIG. 7, among a first electronic device 710, a second electronic device 720, a third electronic device 730, and a fourth electronic device 740, information about electronic device IDs and security levels may be exchanged. Each of the plurality of electronic devices 710, 720, 730, and 740 may determine a master electronic device by comparing their own security level with those of other electronic devices. The master electronic device may generate a security key, and may provide each electronic device with a partial security key generated by removing a portion of the security key based on each security level of each electronic device. Accordingly, as described above with reference to FIGS. 1 through 5, partial security keys from which different portions from each other are respectively omitted may be stored in the plurality of electronic devices 710, 720, 730, and 740. For example, a portion 715 corresponding to the security key form which 3/10 is removed and a portion 725 corresponding to the security key from which 4/10 is removed may be stored in the first electronic device 710 and the second electronic device 720, respectively. In addition, a portion 735 corresponding to the security key from which 2/10 is removed and a portion 745 corresponding to the security key from which 1/10 is removed may be stored in the third electronic device 730 and the fourth electronic device 740, respectively.

The second electronic device 720 may receive a decryption request for encrypted data. For example, the second electronic device 720 may receive a user input requesting access to a certain application. To access the certain application, the second electronic device 720 needs to decrypt encrypted data, and to this end, the second electronic device 720 may request a removed portion of the security key, from other electronic devices. To request a removed portion of the security key, the second electronic device 720 may select a closest electronic device among the other electronic devices 710, 730, and 740 which are storing partial security keys. For example, the second electronic device 720 may determine that the first electronic device 710 having a greatest signal strength among signals received from the other electronic devices 710, 730, and 740, is closest to the second electronic device 710 and thus select the first electronic device 710.

The second electronic device 720 may request a removed portion of the security key, from the first electronic device 710. For example, the second electronic device 720 may specify a removed portion and transmit a request message including information on the specified portion to the first electronic device 710. According to another example, the second electronic device 720 may transmit a request message for requesting to provide the security key to the first electronic device 710 without specifying the removed portion.

The second electronic device 720 may receive the removed portion from the first electronic device 710 based on the request message. When a request is made by specifying a removed portion, the second electronic device 720 according to an embodiment of the disclosure may receive a removed portion 728 from the first electronic device 710. According to another embodiment of the disclosure, when the second electronic device 720 has not specified a removed portion, the second electronic device 720 may receive the partial security key stored in the first electronic device 710.

The second electronic device 720 may generate a security key by using the removed portion and the stored partial security key. In addition, the second electronic device 720 may decrypt encrypted data based on the generated security key.

Figure 8:
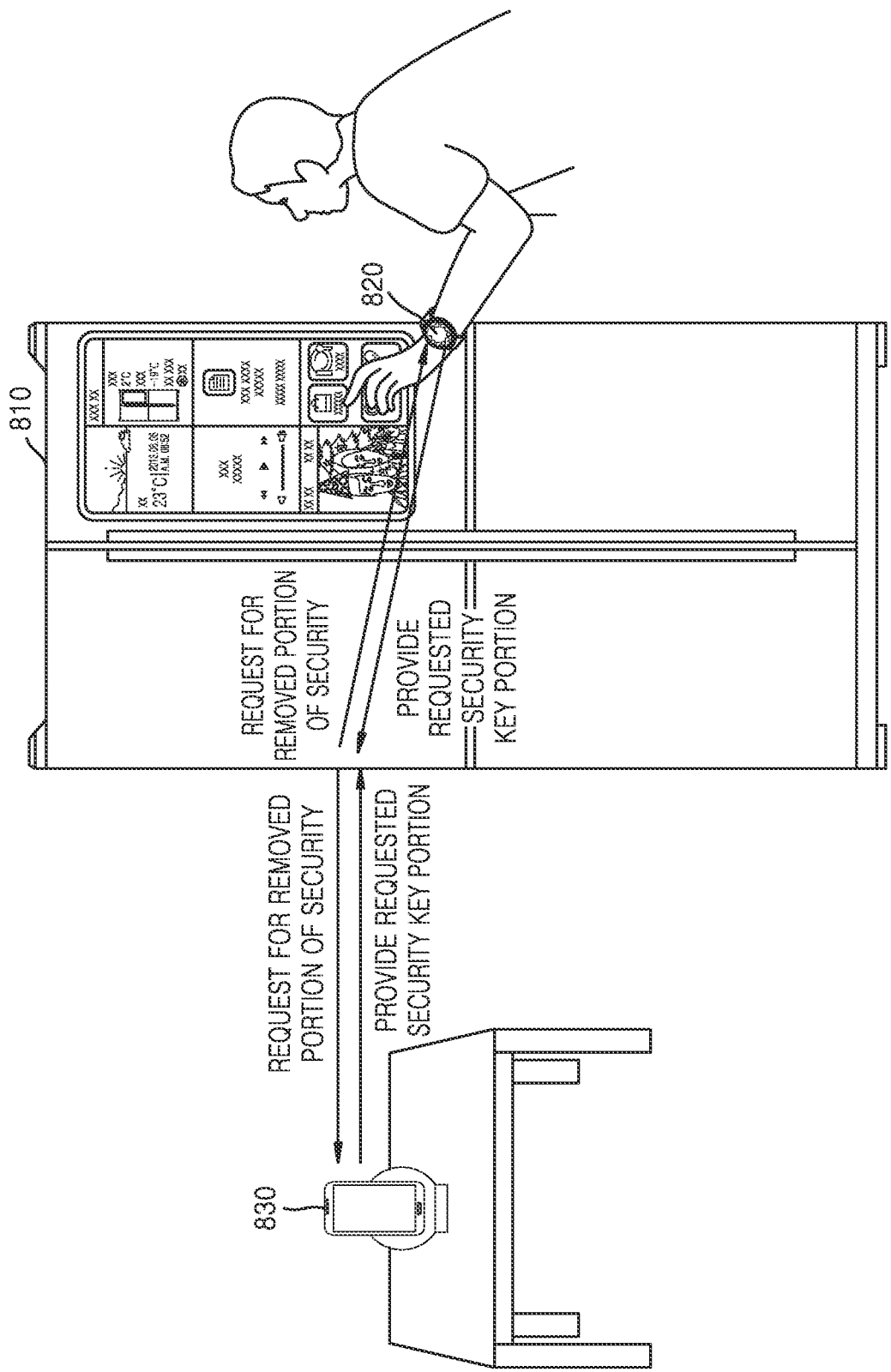
FIG. 8 is a diagram for describing a method, performed by an electronic device, of receiving a portion removed from a security key from another electronic device and generating a security key according to an embodiment of the disclosure.

FIG. 8 is a diagram for describing a method, performed by an electronic device of receiving a portion removed from a security key from another electronic device and generating a security key according to an embodiment of the disclosure.

Referring to FIG. 8, among a first electronic device 810, a second electronic device 820, and a third electronic device 830, information about electronic device IDs and security levels may be exchanged. Each of the plurality of electronic devices 810, 820, and 830 may determine a master electronic device by comparing their own security level with those of other electronic devices. The master electronic device may generate a security key, and may provide each electronic device with a partial security key generated by removing a portion of the security key based on each security level of each electronic device. In the embodiment illustrated in FIG. 8, as described above with reference to FIG. 5, a partial security key from which a plurality of portions of the security key are omitted may be provided to an electronic device having a weakest security level among the plurality of electronic devices. For example, the first electronic device 810 among the plurality of electronic devices 810, 820, and 830 may be an IoT refrigerator, which is an electronic device shared by a plurality of users. In general, an electronic device shared by a plurality of users may have a lower security level than the second electronic device 820 and the third electronic device 830. Accordingly, the first electronic device 810 may be provided with a partial security key from which a plurality of portions constituting the security key are omitted. When the third electronic device 830 is the master electronic device having a highest security level among the plurality of electronic devices 810, 820, and 830, the third electronic device 830 may provide the first electronic device 810 with a partial security key corresponding to the security key from which a plurality of portions are removed. In addition, the third electronic device 830 may provide the second electronic device 820 with a partial security key corresponding to the security key from which one portion is removed, and the third electronic device 830 may also store a partial security key corresponding to the security key from which one portion is removed.

When the first electronic device 810 receives, from a user, an input for requesting execution of a shopping application, decryption of encrypted data may be required to execute the shopping application. Accordingly, the first electronic device 810 may request from other nearby electronic devices 820 and 830 a portion removed from the security key. In the case of the first electronic device 810, a plurality of portions are removed from the security key thereof, and the plurality of removed portions are stored in the second electronic device 820 and the third electronic device 830, respectively, and thus, the first electronic device 810 may request the removed portions of the security key from both the second electronic device 820 and the third electronic device 830.

The first electronic device 810 may receive the removed portions from the second electronic device 820 and the third electronic device 830, respectively, based on the request. When the first electronic device 810 has made the request by specifying a removed portion, the first electronic device 810 may receive the removed portion from each of the second electronic device 820 and the third electronic device 830. According to another embodiment of the disclosure, when the first electronic device 810 has not specified a removed portion, the first electronic device 810 may receive the partial security key 715 stored in each of the second electronic device 820 and the third electronic device 830.

The first electronic device 810 may generate a security key by using the removed portions and the stored partial security keys. In addition, the first electronic device 810 may execute the shopping application by decrypting the encrypted data based on the generated security key.

Figure 9:
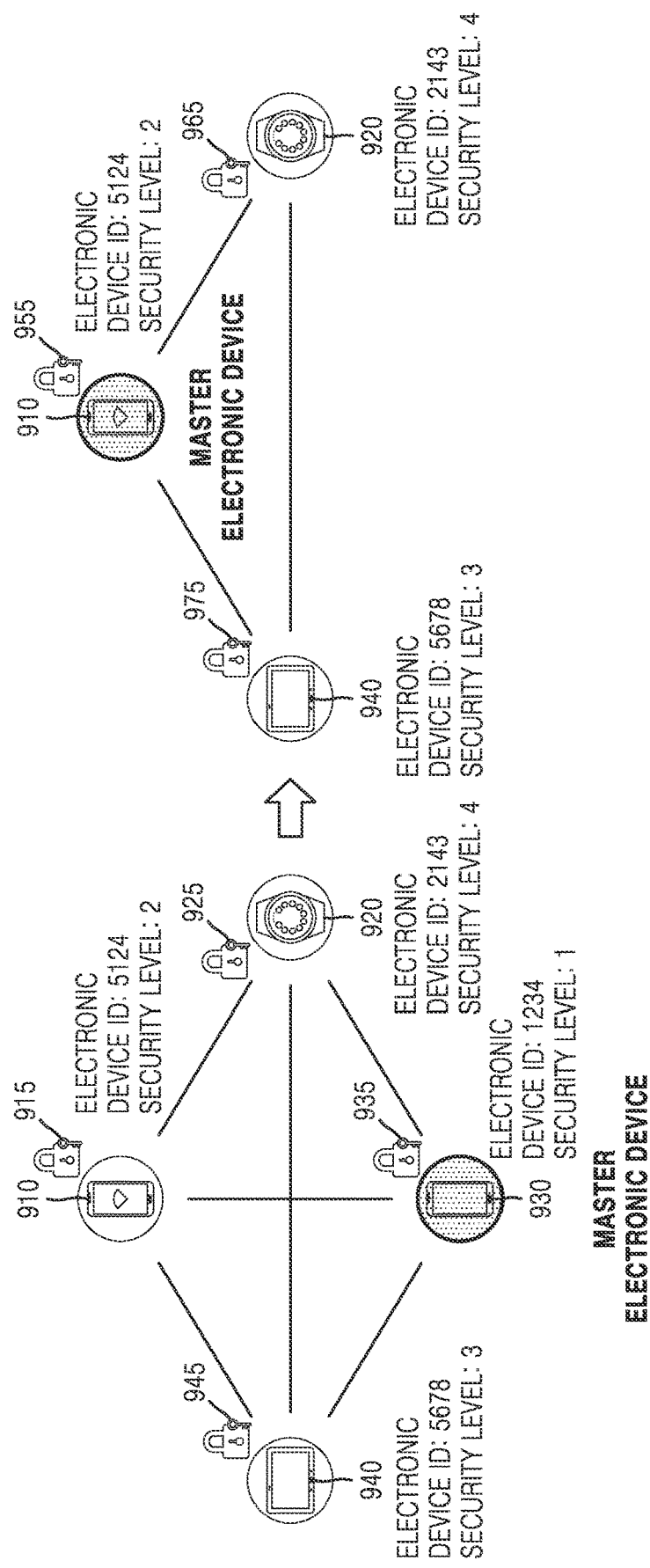
FIG. 9 is a diagram for describing a method of updating a security key when a communication session of a plurality of electronic devices which are managing a security key is interrupted, according to an embodiment of the disclosure.

FIG. 9 is a diagram for describing a method of updating a security key when a communication session of some of a plurality of electronic devices which are managing a security key, according to an embodiment of the disclosure.

Referring to FIG. 9, among a first electronic device 910, a second electronic device 920, a third electronic device 930, and a fourth electronic device 940, information about electronic device IDs and security levels may be exchanged. Each electronic device may transmit information about their own electronic device ID and security level to other nearby electronic devices by using a multicast or broadcast method. However, this is merely an embodiment, and the electronic devices may also transmit information about their own electronic device IDs and security levels to each of the nearby electronic devices by using a unicast method.

Each of the plurality of electronic devices 910, 920, 930, and 940 may determine a master electronic device by comparing their own security level with those of other electronic devices. In the embodiment of the disclosure FIG. 9, as the security levels of the first electronic device 910, the second electronic device 920, the third electronic device 930, and the fourth electronic device 940 are level 2, level 4, level 1, and level 3, respectively, the third electronic device 930 may be determined as a master electronic device.

When the third electronic device 930 is determined as the master electronic device, the third electronic device 930 may generate a security key according to a preset algorithm. The third electronic device 930 may determine a portion to be removed from a security key for each electronic device based on the security level of each electronic device. The third electronic device 930 may provide partial security keys 915, 925, 935, and 945 generated as a result of removing the determined portion, to the first electronic device 910, the second electronic device 920, and the fourth electronic device 940, respectively.

When a communication session with at least one of the plurality of electronic devices 910, 920, 930, and 940 is interrupted, the partial security key cannot be provided from the electronic device in which the communication session is interrupted, and thus, the security key needs to be updated. For example, when a certain electronic device moves to a remote location where a signal cannot reach or power is turned off, a communication session between the certain electronic device and another electronic device may be interrupted. Accordingly, a process of updating the security key may be performed among the other electronic devices except for the electronic device in which the communication session is interrupted, among the plurality of electronic devices 910, 920, 930, and 940. A process of updating a security key in a case in which a communication session with the third electronic device 930 which is the master electronic device is interrupted is described below.

The first electronic device 910, the second electronic device 920, and the fourth electronic device 940 may determine a new master electronic device based on information about their electronic device IDs and security levels. The electronic devices 910, 920, and 940 may determine a new master electronic device based on the information about electronic device IDs and security levels exchanged in an initial connection operation. According to another embodiment of the disclosure, the electronic devices 910, 920, and 940 may exchange information about electronic devices ID and security levels again to determine a new master electronic device.

Each of the first electronic device 910, the second electronic device 920, and the fourth electronic device 940 may determine a new master electronic device by comparing their own security level with those of other electronic devices. For example, the first electronic device 910 having a highest security level may be determined as the new master electronic device. Accordingly, the first electronic device 910 may generate a new security key, and may provide each electronic device with new partial security keys 955, 965, and 975 generated by removing a portion of the security key based on the security level of each electronic device. Accordingly, as described above with reference to FIGS. 1 to 5, in the first electronic device 910, the second electronic device 920, and the fourth electronic device 940, partial security keys from which different portions from each other are omitted may be stored.

Figure 10:
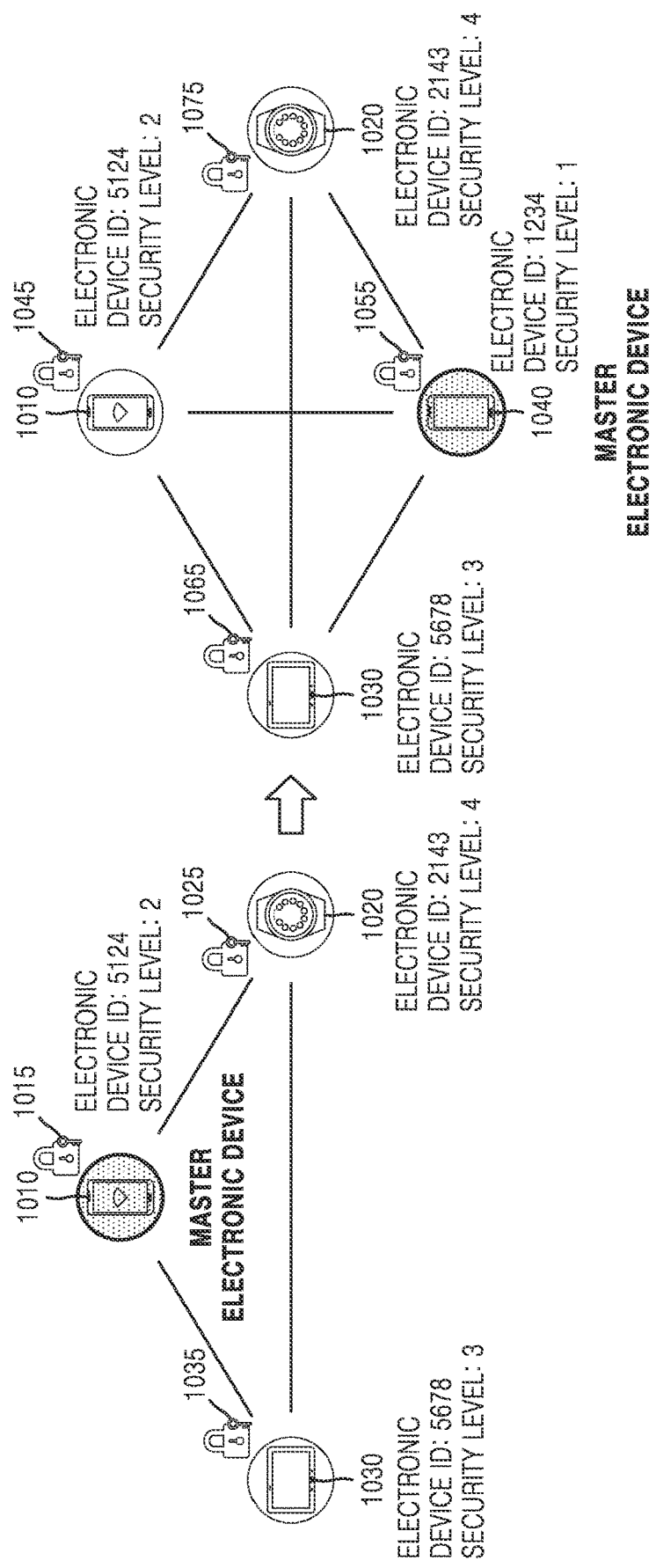
FIG. 10 is a diagram for describing a method of updating a security key when a connection to another electronic device is added to a plurality of electronic devices which are managing a security key according to an embodiment of the disclosure.

FIG. 10 is a diagram for describing a method of updating a security key when a connection to another electronic device is added to a plurality of electronic devices which are managing a security key, according to an embodiment of the disclosure.

Referring to FIG. 10, information about electronic device IDs and security levels may be exchanged among a first electronic device 1010, a second electronic device 1020, and a third electronic device 1030. Each electronic device may transmit information about their own electronic device IDs and security levels to other nearby electronic devices by using a multicast or broadcast method. However, this is merely an embodiment, and the electronic devices may also transmit information about their own electronic device IDs and security levels to each of the nearby electronic devices by using a unicast method.

Each of the plurality of electronic devices 1010, 1020, and 1030 may determine a master electronic device by comparing their own security level with those of other electronic devices. In the embodiment illustrated in FIG. 10, as the security levels of the first electronic device 1010, the second electronic device 1020, and the third electronic device 1030 are level 2, level 4, and level 3, respectively, the first electronic device 1010 may be determined as a master electronic device.

When the first electronic device 1010 is determined as the master electronic device, the first electronic device 1010 may generate a security key according to a preset algorithm. The first electronic device 1010 may determine a portion to be removed from a security key for each electronic device based on the security level of each electronic device. The first electronic device 1010 may provide partial security keys 1025 and 1035 obtained by removing the determined portion from the security key to the second electronic device 1020 and the third electronic device 1030, respectively. The first electronic device 1010 may store a partial security key 1015 obtained by removing a portion corresponding to its own security level from the security key.

When a new fourth electronic device 1040 to which a communication session may be connected with the plurality of electronic devices 1010, 1020, and 1030 is detected, for security key management, the plurality of electronic devices 1010, 1020, and 1030 may have to update the security key in consideration of a security level of the new electronic device 1040. Accordingly, a process of updating the security key may be performed among the first electronic device 1010, the second electronic device 1020, the third electronic device 1030, and the fourth electronic device 1040.

The first electronic device 1010, the second electronic device 1020, the third electronic device 1030, and the fourth electronic device 1040 may determine a new master electronic device based on information about their electronic device IDs and security levels. For example, the fourth electronic device 1040 having a highest security level may be determined as a new master electronic device. Accordingly, the fourth electronic device 1040 may generate a security key, and may provide each electronic device with new partial security keys 1045, 1055, 1065, and 1075 generated by removing a portion of the security key based on the security level of each electronic device. Accordingly, as described above with reference to FIGS. 1 to 5, in the first electronic device 1010, the second electronic device 1020, the third electronic device 1030, and the fourth electronic device 1040, partial security keys from which different portions from each other are omitted may be stored.

Figure 11:
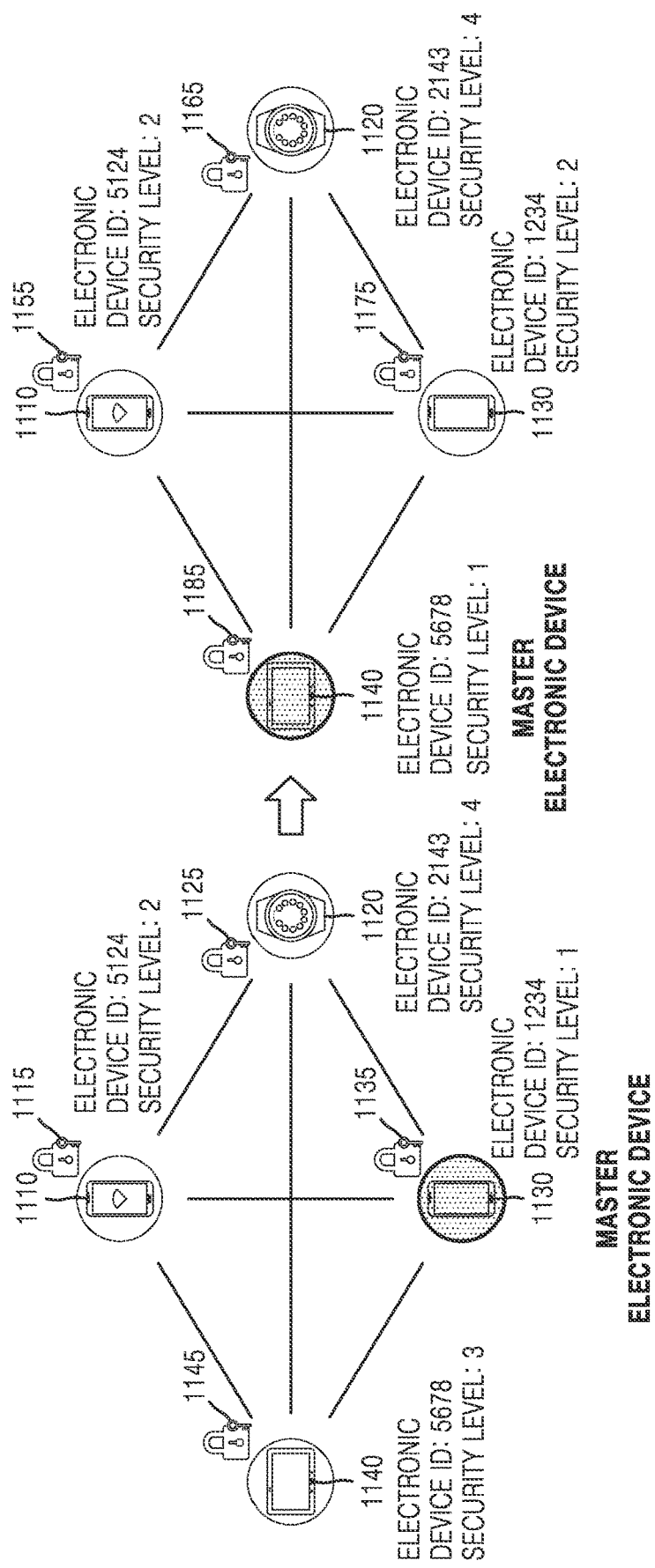
FIG. 11 is a diagram for describing a method of updating a security key when a security level of at least one of a plurality of electronic devices which are managing a security key is changed, according to an embodiment of the disclosure.

FIG. 11 is a diagram for describing a method of updating a security key when a security level of at least one of a plurality of electronic devices which are managing a security key is changed, according to an embodiment of the disclosure.

Referring to FIG. 11, information about electronic device IDs and security levels may be exchanged among a first electronic device 1110, a second electronic device 1120, a third electronic device 1130, and a fourth electronic device 1140. Each electronic device may transmit information about their own electronic device ID and security level to other nearby electronic devices by using a multicast or broadcast method. However, this is merely an embodiment, and the electronic devices may also transmit information about their own electronic device IDs and security levels to each of the nearby electronic devices by using a unicast method.

Each of the plurality of electronic devices 1110, 1120, 1130, and 1140 may determine a master electronic device by comparing their own security level with those of other electronic devices. In the embodiment illustrated in FIG. 11, as the security levels of the first electronic device 1110, the second electronic device 1120, the third electronic device 1130, and the fourth electronic device 1140 are level 2, level 4, level 1, and level 3, respectively, the third electronic device 1130 may be determined as a master electronic device.

When the third electronic device 1130 is determined as the master electronic device, the third electronic device 1130 may generate a security key 1135 according to a preset algorithm. The third electronic device 1130 may determine a portion to be removed from the security key for each electronic device based on the security level of each electronic device. The third electronic device 1130 may provide partial security keys 1115, 1125, and 1145 obtained by removing the determined portion, to the first electronic device 1110, the second electronic device 1120, and the fourth electronic device 1140, respectively. The first electronic device 1110 may store the partial security key 1115 obtained by removing a portion corresponding to its own security level from the security key.

When the security level of at least one of the plurality of electronic devices 1110, 1120, 1130, or 1140 changes, it is necessary to update the security key in consideration of the changed security level. Accordingly, a process of updating the security key may be performed among the first electronic device 1110, the second electronic device 1120, the third electronic device 1130, and the fourth electronic device 1140.

The first electronic device 1110, the second electronic device 1120, the third electronic device 1130, and the fourth electronic device 1140 may exchange information about their electronic device IDs and the changed security level. As described above, the first electronic device 1110, the second electronic device 1120, the third electronic device 1130, and the fourth electronic device 1140 may determine an electronic device having a highest security level as a new master electronic device, based on information about the changed security level. In the embodiment, it is assumed that the security level of the fourth electronic device 1140 is increased from level 3 to level 1. As the security level of the fourth electronic device 1140 among the plurality of electronic devices 1110, 1120, 1130, and 1140 is determined to be the best according to the change in security levels, the fourth electronic device 1140 may be determined as a new master electronic device. Accordingly, the fourth electronic device 1140 may generate a new security key, and may provide the electronic devices with new partial security keys 1155, 1165, 1175, 1185 generated by removing a portion of the security key based on the security level of each electronic device. Accordingly, as described above with reference to FIGS. 1 to 5, in the first electronic device 1110, the second electronic device 1120, the third electronic device 1130, and the fourth electronic device 1140, partial security keys from which different portions from each other are omitted may be stored.

Figure 12:
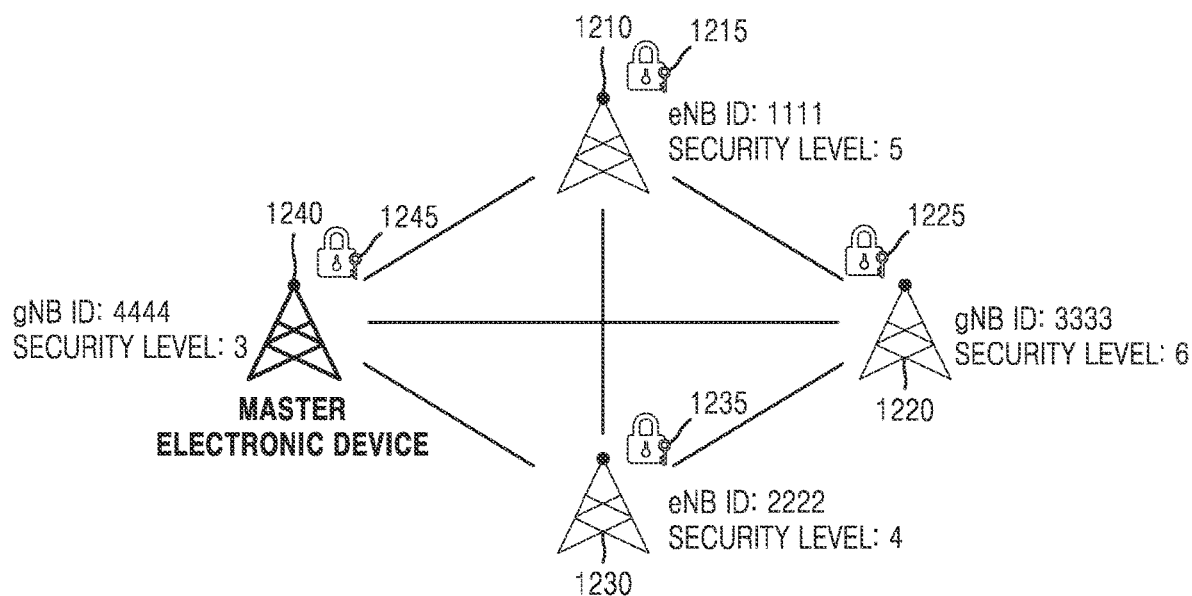
FIG. 12 is a diagram for describing a method, performed by a plurality of base stations, of generating and storing a security key by using a security key management method according to an embodiment of the disclosure.

FIG. 12 is a diagram for describing a method, performed by a plurality of base stations, of generating and storing a security key by using a security key management method according to an embodiment of the disclosure.

Referring to FIG. 12, a communication session may be established between a plurality of base stations 1210, 1220, 1230, and 1240. The plurality of base stations 1210, 1220, 1230, and 1240 may include at least one of evolved node B (eNB), which is a 4G base station, or a generation node B (gNB), which is a 5G base station. For example, the plurality of base stations may be all eNBs or all gNBs, and according to another example, eNB and gNB may be included in the plurality of base stations.

A security key management method for a situation where eNB and gNB co-exist is described as an example, but this is merely an example, and a security key management method to be described below may also apply to a plurality of base stations consisting of eNBs or a plurality of base stations consisting of gNBs.

The plurality of base stations 1210, 1220, 1230, and 1240 may each transmit or receive security information through an established communication session thereof. In addition, each of the plurality of base stations 1210, 1220, 1230, and 1240 may compare their own security level with those of others, and determine a master electronic device having a highest security level. As described above with reference to FIG. 2, a security level may be determined based on at least one of a key storage on hardware, a key storage on software, an operating system, a communication network, or a location of the electronic device, and in the embodiment, the fourth base station 1240 is assumed to have a highest security level.

As the fourth base station 1240 is determined as a master electronic device, the fourth base station 1240 may generate a security key according to a preset algorithm. The fourth base station 1240 may determine a portion to be removed from a security key for each security level of each base station. For example, the fourth base station 1240 may determine, as a weight, a value obtained by dividing security levels of the base stations by a sum of the security levels, and determine a portion to be removed from the security key of each base station based on the determined weight. Accordingly, the first base station 1210 may receive, from the fourth base station 1240, a first partial security key 1215 obtained by removing a 5/18 portion from the security key. Also, the second base station 1220 may receive, from the fourth base station 1240, a second partial security key 1225 obtained by removing a 6/18 portion from the security key. The third base station 1240 may receive, from the fourth base station 1240, a third partial security key 1235 obtained by removing a 4/18 portion from the security key. The fourth base station 1240 may store a fourth partial security key 1245 obtained by removing a 3/18 portion from the security key.

When decryption of encrypted data is required in any one of the plurality of base stations 1210, 1220, 1230, and 1240, the one base station (e.g. base station 1220) may request from at least one other base station (e.g., base station 1210) the corresponding removed security key portion and receive the requested removed security key. A base station (e.g., base station 1220) may generate a security key by combining a received security key portion with a partial security key (e.g., security key portion 1225) stored therein, and decrypt encrypted data by using the generated security key.

Figure 13:
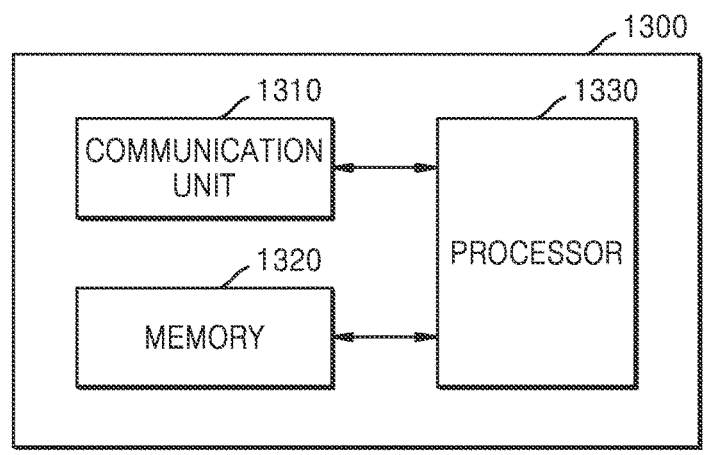
FIG. 13 is a block diagram of an electronic apparatus according to an embodiment of the disclosure.

FIG. 13 is a block diagram of an electronic apparatus according to an embodiment of the disclosure.

Referring to FIG. 13, an electronic device 1300 according to an embodiment of the disclosure may include a communication unit 1310, a memory 1320, and a processor 1330. However, not all of the illustrated components are essential components. The electronic device 1300 may be implemented by more components than the illustrated ones or the electronic device 1300 may also be implemented by fewer components than the illustrated ones.

The communication unit 1310 may include one or more components enabling communication with other electronic devices and other external devices. For example, the communication unit 1310 may include a short-range communication unit, a mobile communication unit, or the like.

The short-range communication unit may include a Bluetooth communication unit, Bluetooth Low Energy (BLE) communication unit, a Near Field communication unit, a wireless local area network (WLAN) (Wi-Fi) communication unit, a Zigbee communication unit, an infrared data association (IrDA) communication unit, a Wi-Fi Direct (WFD) communication unit, an ultra wideband (UWB) communication unit, an Ant+ communication unit, etc., but is not limited thereto.

The mobile communication unit transmit or receive a radio signal to or from at least one of a base station, another electronic device, or an external server. Here, the radio signal may include various types of data according to the transmission/reception of an ID of the electronic device, information about a security level, or a partial security key.

The memory 1320 may store a program that causes the electronic device 1300 to perform the security key management method as described above with reference to FIGS. 1 to 12. The memory 1320 may store data required for security key management. For example, the memory 1320 may store information about IDs and security levels of the electronic device 1300 and other electronic devices, and partial security keys.

The memory 1320 may include at least one type of storage medium from among a flash memory type, a hard disk type, a multimedia card micro type, a card type memory (e.g., secure digital (SD) or extreme digital (XD) memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

The processor 1330 may receive security information from each of at least one other electronic device through the communication unit 1310. The processor 1330 may determine a master electronic device based on the security level of the electronic device 1300 and the security level of at least one other electronic device included in the received security information. As the electronic device 1300 is determined as the master electronic device, the processor 1330 may generate a security key, and determine a portion to be removed from a security key according to each security level of the plurality of electronic devices including the electronic device 1300 and the at least one other electronic device. The processor 1330 may provide each of the partial security keys from which the determined portion is omitted, to the at least one other electronic device through the communication unit 1310.

The processor 1330 may remove, from the security key, a portion corresponding to the security level of the electronic device 1300 and store a partial security key obtained by removing the portion corresponding to the security level of the electronic device 1300. As a request for decryption of encrypted data of the electronic device 1300 is received, the processor 1330 may request the removed portion, from at least one other electronic device through the communication unit 1310. The processor 1330 may receive the removed portion, from at least one other electronic device through the communication unit 1310, based on the request. The processor 1330 may decrypt the encrypted data based on a security key generated using the removed portion and the stored partial security key.

The processor 1330 according to an embodiment of the disclosure may identify another electronic device located at a closest distance to the electronic device 1300 among the at least one other electronic device. Also, the processor 1330 may request the removed portion, from the identified other electronic device through the communication unit 1310.

The processor 1330 may receive a request for the portion removed from the security key, from one of the at least one other electronic device through the communication unit 1310. The processor 1330 may identify the removed portion of the security key corresponding to the other electronic device that has transmitted the request, and provide the identified portion to the other electronic device through the communication unit 1310.

When another electronic device other than the at least one other electronic device is detected, the processor 1330 may receive new security information from the detected electronic device through the communication unit 1310. The processor 1330 may update the master electronic device based on the security level included in the new security information. Here, as new security information is received, the security key and the portion removed from the security key with respect to each security level may be updated.

The processor 1330 according to an embodiment of the disclosure may identify another electronic device, a communication session of which is interrupted, among the at least one other electronic device. In addition, the processor 1330 may generate a new security key based on the security level of the electronic device and the security levels of electronic devices other than the other electronic device, the communication session of which is interrupted, and update the portion removed from the security key, according to the security level.

As the security level of one of the electronic device and at least one other electronic device is changed, the processor 1330 according to an embodiment of the disclosure may update the portion removed from the security key for each security level based on the changed security level.

When one of the at least one other electronic device is determined as the master electronic device, the processor 1330 according to an embodiment of the disclosure may receive, from the determined other electronic device through the communication unit 1310, a partial security key obtained by removing, from the security key, a portion corresponding to the security level of the electronic device.

The processor 1330 may discard the partial security key stored in the memory 1320 after a preset period of time after generation of the security key.

Each component of the block diagrams may be integrated, added, or omitted according to the specifications of a device that is actually implemented. That is, when necessary, two or more components may be combined into a single component, or a single component may be divided into two or more components. In addition, functions performed by each block are for explaining embodiments of the disclosure, and specific operations or devices thereof do not limit the scope of the disclosure.

The methods according to the embodiments described in the claims or the specification of the disclosure may be implemented as hardware or software or as a combination of hardware and software.

When implemented as software, a computer-readable storage medium storing one or more programs (software modules) may be provided. One or more programs stored in the computer-readable storage medium are configured for execution by one or more processors in an electronic device (device). One or more programs include instructions for causing an electronic device to execute methods according to embodiments described in the claims or the specification of the disclosure.

The above-described programs (software modules, software) may be stored on non-volatile memories including random access memory, flash memory, read only memory (ROM), electrically erasable programmable ROM (Electrically Erasable Programmable Read Only Memory (EEPROM)), magnetic disc storage device, Compact Disc-ROM (CD-ROM), Digital Versatile Discs (DVDs), or any other form of optical storage device or a magnetic cassette. Alternatively, the programs may be stored in a memory configured with a combination of some or all thereof. In addition, each constituent memory may be included in plurality.

In addition, the programs may be stored in an attachable storage device accessible by a communication network such as the Internet, Intranet, Local Area Network (LAN), Wireless LAN (WLAN), or Storage Area Network (SAN), or a combination thereof. The above-described storage device may be connected to a device implementing an embodiment of the disclosure through an external port. In addition, a separate storage device on the communication network may be connected to the device implementing the embodiments of the disclosure.

In the specific embodiments of the disclosure described above, elements included in the disclosure are expressed in the singular or plural according to the presented specific embodiments. However, for convenience of description, the singular or plural expression is appropriately selected for the context presented, and the disclosure is not limited to the singular or plural elements, and even when an element is expressed in plural, the element may consist of a single element or an element expressed as singular may consist of a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device for managing a security key, the electronic device comprising:
 a communication unit;
 a memory storing one or more instructions; and
 at least one processor configured to execute the one or more instructions stored in the memory,
 wherein the at least one processor is further configured to:
  receive, through the communication unit, security information from each of at least one other electronic device,
  determine a master electronic device based on a security level of the electronic device and a security level of the at least one other electronic device, the security level of the at least one other electronic device being included in the received security information,
  generate a security key based on a result of the determination,
  determine a portion to be removed from the security key for each security level of a plurality of electronic devices including the electronic device and the at least one other electronic device, and provide, through the communication unit, a partial security key from which the determined portion is omitted, to the at least one other electronic device.

2. The electronic device of claim 1, wherein the at least one processor is further configured to:
remove a portion of the security key, the portion corresponding to the security level of the electronic device; and
store a partial security key obtained by removing a portion corresponding to the security level of the electronic device.

3. The electronic device of claim 2, wherein the at least one processor is further configured to:
request, from the at least one other electronic device through the communication unit, the removed portion according to reception of a request for decryption of encrypted data of the electronic device;
receive, through the communication unit, the removed portion from the at least one other electronic device, based on the request; and
decrypt the encrypted data based on a security key generated using the removed portion and the stored partial security key.

4. The electronic device of claim 3, wherein the at least one processor is further configured to:
identify a second electronic device that is closest to the electronic device among the at least one other electronic device; and
request, through the communication unit, the removed portion from the identified second electronic device.

5. The electronic device of claim 1, wherein the at least one processor is further configured to:
receive, through the communication unit, a request for the removed portion from the security key from one of the at least one other electronic device;
identify the removed portion of the security key, the removed portion corresponding to the at least one other electronic device that has transmitted the request; and
provide, through the communication unit, the identified portion to the at least one other electronic device.

6. The electronic device of claim 1, wherein the at least one processor is further configured to:
receive, through the communication unit, new security information from a second electronic device other than the at least one other electronic device;
update the master electronic device based on a security level included in the new security information; and as new security information is received, update the security key and the portion to be removed from the security key for each security level.

7. The electronic device of claim 1, wherein the at least one processor is further configured to:
identify a second electronic device, a communication session of which is interrupted, among the at least one other electronic device; and
update the portion to be removed from the security key for each security level based on the security level of the electronic device and the security level of the other electronic devices except the second electronic device, the communication session of which is interrupted, among the at least one other electronic device.

8. The electronic device of claim 1, wherein the at least one processor is further configured to update the portion to be removed from the security key for each security level, based on a changed security level as a security level of one of the electronic device and the at least one other electronic device is changed.

9. The electronic device of claim 1, wherein the at least one processor is further configured to, as one of the at least one other electronic device is determined as a master electronic device, receive, through the communication unit, a partial security key obtained by removing a portion corresponding to the security level of the electronic device from the security key, from the determined other electronic device.

10. The electronic device of claim 1, wherein the security level of the electronic device is determined based on at least one of a key storage on hardware, a key storage on software, an operating system, a communication network, or a location of the electronic device.

11. The electronic device of claim 1, wherein the partial security
key provided to each electronic device is discarded after a preset period of time after generating the security key.

12. A method, performed by an electronic device, of managing a security key, the method comprising:
receiving security information from each of at least one other electronic device;
determining a master electronic device based on a security level of the electronic device and a security level of the at least one other electronic device, the security level of the at least one other electronic device being included in the received security information;
generating a security key based on a result of the determination;
determining a portion to be removed from the security key for each security level of a plurality of electronic devices including the electronic device and the at least one other electronic device; and
providing each partial security key from which the determined portion is omitted, to the at least one other electronic device.

13. The method of claim 12, further comprising:
removing a portion of the security key, the portion corresponding to the security level of the electronic device; and
storing a partial security key obtained by removing a portion corresponding to the security level of the electronic device.

14. The method of claim 13, further comprising:
requesting, from the at least one other electronic device, the removed portion according to reception of a request for description of encrypted data of the electronic device; and
receiving the removed portion from the at least one other electronic device based on the request; and
decrypting the encrypted data based on a security key generated using the removed portion and the stored partial security key.

15. The method of claim 12, further comprising:
receiving a request for the removed portion from the security key from one of the at least one other electronic device;
identifying the removed portion of the security key, the removed portion corresponding to the at least one other electronic device that has transmitted the request; and
providing the identified portion to the at least one other electronic device.

16. The method of claim 12, further comprising:
receiving new security information from a second electronic device other than the at least one other electronic device; and updating the master electronic device based on a security level included in the new security information, wherein, as new security information is received, the security key and the portion to be removed from the security key for each security level are updated.

17. The method of claim 12, further comprising:
identifying a second electronic device, a communication session of which is interrupted, among the at least one other electronic device; and
updating the portion to be removed from the security key for each security level based on the security level of the electronic device and the security level of the other electronic devices except the second electronic device, the communication session of which is interrupted, among the at least one other electronic device.

18. The method of claim 12, further comprising updating the portion to be removed from the security key for each security level, based on a changed security level as a security level of one of the electronic device and the at least one other electronic device is changed.

19. The method of claim 12, further comprising, based on a result of the determination, receiving a partial security key obtained by removing a portion corresponding to the security level of the electronic device from the security key, from another electronic device determined to be the master electronic device.

20. A computer program product comprising a non-transitory computer-readable recording medium having stored therein a program for causing an electronic device to perform a method of managing a security key, the method comprising:
receiving security information from each of at least one other electronic device;
determining a master electronic device based on a security level of the electronic device and a security level of the at least one other electronic device, the security level being included in the received security information;
generating a security key based on a result of the determination;
determining a portion to be removed from the security key for each security level of a plurality of electronic devices including the electronic device and the at least one other electronic device; and
providing each partial security key from which the determined portion is omitted, to the at least one other electronic device.

* * * * *